United States Patent
LaComb et al.

(10) Patent No.: US 7,492,805 B2
(45) Date of Patent: Feb. 17, 2009

(54) SCALABLE SPHERICAL LASER

(76) Inventors: Ronald LaComb, 40 John Potter Rd., West Greenwich, RI (US) 02817; Sallie S. Townsend, 119 Coleman Rd., Manchester, CT (US) 06042-3310

(*) Notice: Subject to any disclaimer, the term of this patent is extended or adjusted under 35 U.S.C. 154(b) by 51 days.

(21) Appl. No.: 11/401,561

(22) Filed: Apr. 11, 2006

(65) Prior Publication Data

US 2006/0227842 A1    Oct. 12, 2006

Related U.S. Application Data (60) Provisional application No. 60/669,960, filed on Apr. 11, 2005, provisional application No. 60/757,608, filed on Jan. 11, 2006, provisional application No. 60/763,772, filed on Feb. 1, 2006.

(51) Int. Cl.
*H01S 3/06* (2006.01)

(52) U.S. Cl. .......................... 372/67; 372/66

(58) Field of Classification Search ............... 372/69, 372/70, 83, 67; 359/25; 376/107
See application file for complete search history.

(56) References Cited

U.S. PATENT DOCUMENTS

| | | | | |
|---|---|---|---|---|
| 3,440,561 A | * | 4/1969 | Pole et al. | 372/66 |
| 3,516,013 A | * | 6/1970 | Pole | 372/24 |
| 4,011,855 A | * | 3/1977 | Eshelman | 126/660 |
| 4,829,537 A | * | 5/1989 | Baer | 372/66 |
| 5,631,778 A | * | 5/1997 | Powell | 359/724 |
| 6,175,454 B1 | * | 1/2001 | Hoogland et al. | 359/725 |
| 6,807,216 B1 | * | 10/2004 | Hilliard | 372/66 |

* cited by examiner

*Primary Examiner*—Minsun Harvey
*Assistant Examiner*—Tuan N. Nguyen
(74) *Attorney, Agent, or Firm*—McCormick, Paulding & Huber LLP (57) ABSTRACT

A spherical laser includes a transparent or semi-transparent outer spherical vessel having an internal cavity, an amplifying medium in the cavity, and means to excite the amplifying medium. The sphere is provided with a partially reflective coating to act as a spherical optical resonator. Excitation of the amplifying medium produces an optical gain. When the gain exceeds cavity losses and threshold conditions are met, lasing is supported. This creates a three-dimensional, spherically radiating emission, emulating a point source. The output is radially diverging, but is harnessed by enclosing the sphere within a mirrored ellipse to image the output to a point, or within a mirrored parabola to columinate the emission. A concentric, reflective inner sphere may be disposed in the cavity, with the amplifying medium lying between the two spheres. A voltage potential is applied between the spheres to excite the medium.

10 Claims, 10 Drawing Sheets

SCALABLE SPHERICAL LASER

CROSS REFERENCE TO RELATED APPLICATIONS

This application claims the benefit of U.S. Provisional Application Ser. No. 60/669,960, filed Apr. 11, 2005, U.S. Provisional Application Ser. No. 60/757,608, filed Jan. 11, 2006, and U.S. Provisional Application Ser. No. 60/763,772, filed Feb. 1, 2006, all of which are hereby incorporated by reference herein in their entireties.

FIELD OF THE INVENTION

The present invention relates to coherent light generators and, more particularly, to coherent light generations having a spherical resonant cavity.

BACKGROUND OF THE INVENTION

Modern lasers including semiconductor lasers, gas lasers, and solid state lasers utilize optical cavities consisting of two mirrors or prisms arranged to form closed optical paths of low loss, into which an amplifying medium is inserted. The amplifying medium enclosed within the optical cavity may be gaseous, liquid, crystalline, or a glassy solid. Laser oscillation will occur at specific frequencies if the gain of the medium exceeds cavity losses. Gain of the medium is dependent upon the stimulated emission rate, which is increased when population inversion is present (a necessary condition for lasing). The onset of laser oscillation is governed by threshold conditions and stabilizes at a level that depends on the saturation intensity of the amplifying medium and the reflectance of the mirrors. The beam exits the resonator via an output coupler ("OC"), e.g., a mirror with a reflectivity of less than 1 for the lasing wavelength, in a direction perpendicular to the OC mirror, thereby establishing a directed beam of light (coherent or incoherent, as the case may be). The exiting laser beam propagates in a single direction while supporting lateral and longitudinal modes indicative of the laser design and operation. Gain saturation and second order effects limit the maximum output power of conventional lasers, thereby limiting their scalability. Many applications utilize a focused laser beam, including microscopy, industrial applications (e.g., welding, cutting, and writing), and printing, among others. The minimum spot size achievable is limited by diffraction to approximately one half the wavelength of excitation.

SUMMARY OF THE INVENTION

An embodiment of the present invention relates to a spherical laser apparatus. The apparatus includes a generally spherical body having a semi-reflective surface, e.g., the surface is less than 100% reflective at a frequency bandwidth of interest. "Spherical" means having a surface defined by a set of points in 3-dimensional space that are equidistant from a center point, including semi-spherical surfaces. By "generally" spherical, it is meant spherical within a small percentage due to manufacturing tolerances. The generally spherical body includes an amplifying medium, e.g., the body contains or is composed of the amplifying medium. By "amplifying medium," it is meant one or more gaseous, solid, or liquid materials that generate/emit photons upon excitation of the material(s). (For simplicity of illustration, the term "medium" as used herein refers to one medium or multiple mediums/ media). The apparatus also includes an excitation device for controllable excitation of the amplifying medium. In operation, when the excitation device is controlled to excite the amplifying medium to meet lasing threshold conditions, the generally spherical body emits coherent light, e.g., a radially diverging, three-dimensional beam of coherent light, emulating a point source.

In another embodiment, the generally spherical body includes an outer, generally spherical vessel made of a transparent or semi-transparent substrate material (e.g., transparent at least to frequencies of interest) such as glass or quartz. The outer vessel is provided with a semi-reflective coating to form a spherical optical resonator. An amplifying medium is contained within the outer sphere. Excitation means are provided for exciting the amplifying medium. Excitation of the amplifying medium produces an optical gain. When the gain exceeds cavity losses and threshold conditions are met, lasing is supported. This creates a three-dimensional, spherically radiating output of coherent/laser light through the outer sphere. The output is radially diverging, but at least a portion of the output may be collected (e.g., reflected and/or directed) using a mirror apparatus positioned externally to the spherical laser. For example, the spherical laser may be enclosed within a 3-dimensional, mirrored ellipse to image the output to a point (or partially enclosed within an open-ended mirror ellipse), or within a mirrored parabola to columinate the emission.

In another embodiment, the amplifying medium is an optically excitable or optically active medium. If the medium is a solid or glassy solid, e.g., a doped glass/crystal, the sphere may be a spherical body composed of the optically active medium. Alternatively, the sphere may comprise a spherical vessel (e.g., made of quartz, glass, or other suitable substrate material) having an interior cavity filled with the optically active medium. The sphere is provided with a semi-reflective coating, on the outer surface of the sphere if the sphere is solid, or possibly on the interior surface of the sphere if the sphere has an interior cavity. A "window" in the reflective coating is provided for the admittance of optical stimulation, e.g., radiation at a certain wavelength for exciting the optically active medium. In other words, the coating is semi-reflective at a first frequency bandwidth, with a small area of the coating (forming the window) being transparent to a second frequency bandwidth for admitting optical stimulation. With ample stimulation the sphere will lase, emitting a spherical mode or modes at a wavelength specified by the optically active amplifying media.

In another embodiment, the spherical laser includes a spherical optical resonator having inner and outer, concentric spheres, each made from glass, quartz, or another suitable substrate material. The spheres have mirrored surfaces to provide optical feedback. The mirrored surface of the outer sphere is semi-reflective. The outer sphere has a radius larger than the inner sphere, with the amplifying medium being enclosed in the volume between the concentric spheres. The amplifying medium may be liquid, solid, or gaseous, and may be excited by electrical, optical, or chemical means, depending on the particular medium. The spherical laser includes a mechanism/apparatus (excitation means) for exciting the amplifying medium. When the amplifying medium is sufficiently excited to generate photons exceeding lasing threshold conditions, the outer sphere emits a radially diverging, three-dimensional laser beam. A cooling mechanism may be provided for heat dissipation. The emitted beam can be imaged to a non diffraction-limited spot by utilizing a three-dimensional ellipsoidal mirror, or it can be columnated using a three-dimensional parabolic mirror.

The optical cavity resonator supports spherical modes, e.g., radial and angular modes. The output power is scalable with spherical geometry. The radial components of the spherical modes depend upon the difference in radii between the inner and outer spheres. Increasing both radii proportionally while maintaining a constant cavity length (e.g., distance of separation between the spheres) increases the active cavity volume without affecting the nature of the radial modes and saturation conditions of the amplifying medium. This results in a scalable power source.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1A:
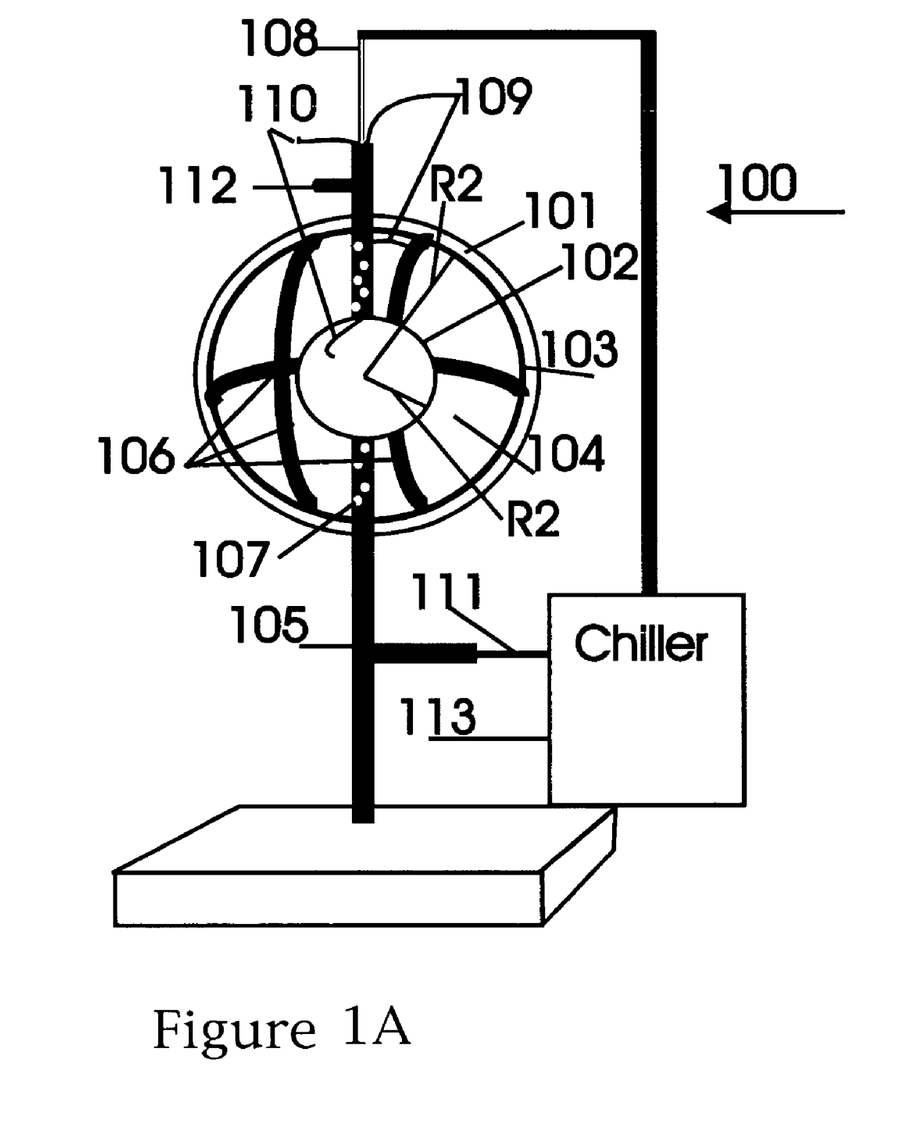
FIG. 1A is a schematic view, partially in cross section, of a scalable spherical laser according to an embodiment of the present invention.
Figure 1B:
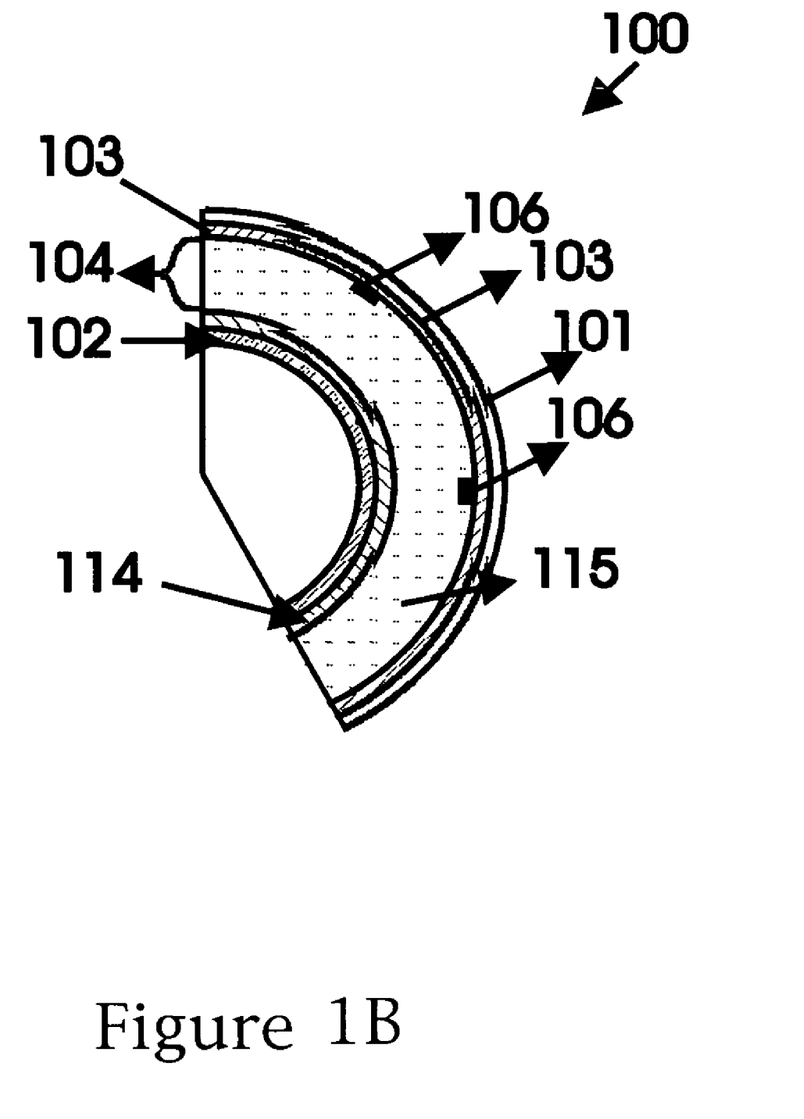
FIG. 1B is a detail view of a portion of the spherical laser in FIG. 1A (component sizes are not to scale, for illustration purposes)

A first embodiment of a scalable spherical laser 100 is shown in FIGS. 1A and 1B. The laser 100 is applicable for use with active amplifying media that do not rely upon vessel sidewall collisions for population inversion. These include molecular, chemical, and similar active media. The spherical laser 100 includes an outer, hollow, vessel-like, generally spherical body 101 ("outer sphere") and an inner, hollow, generally spherical vessel 102 ("inner sphere"). The inner and outer spheres may be concentric. The outer sphere 101 is occasionally referred to herein as the output coupler ("OC") of the laser 100. The outer sphere 101 (shown in cross section in FIG. 1 to illustrate internal components) has a radius R1 greater than that of a radius R2 of the inner sphere 102, e.g., R1>R2. The spheres 101, 102 may be made of glass, quartz, metal, another suitable substrate material, or a combination thereof. A reflective coating is provided on at least one surface of each of the concentric spheres 101, 102. Typically, the convex, outwards facing surface of the inner sphere 102 will be provided with a reflective coating 114 (see FIG. 1B), and the concave, inwards facing surface of the outer sphere 101 will be provided with a reflective coating 103. The reflective coatings may be either metal coatings or multi-layered dielectric coatings. Multi-wavelength operation can also be achieved by utilizing a uniform gain medium with a broad emission spectrum, and reflective coatings designed to amplify multiple wavelengths. The concentric mirrored spheres 101, 102 thus create a spherical optical resonator (spherical optical resonator means) with a resonator cavity length "L", where L=R1−R2.

The cavity region 104 located between the concentric spheres is used to house an amplifying medium 115 (see FIG. 1B). The amplifying medium 115 may be solid, liquid, or gaseous, in each case comprising a system of molecules, atoms, or other particles that can be stimulated electrically, chemically, or optically. Stimulation sets the particles into an excited energy state. Subsequently, upon relaxing to a lower energy state, the particles produce electromagnetic wave energy. If electrical pumping is required for stimulating the medium, electrical contacts or electrodes 106, 116 are included at the spherical surfaces of the inner and outer spheres 101, 102, and an electric potential/voltage is applied between the contacts (DC or AC), thereby forming an electric field throughout the active region, e.g., in the cavity 104 or portion thereof. The electrical contacts may be a transparent conducting film, e.g., ultra-thin transparent metal or indium tin oxide (ITO) 116 (see FIG. 1B), or a sparse conducting metal mesh 106. If the reflective coatings 103, 114 have suitable electrical characteristics, they may also be used as the electrical contacts/electrodes. The contacts are positioned on the interior spherical surface of the outer sphere 101 facing the cavity 104, and on the exterior spherical surface of the inner sphere 102. External contacts are made using an electrical contact lead 109 running from the cavity 104 to the exterior of the outer sphere, and an electrical contact lead 110 running from the inner sphere to the exterior of the outer sphere. The contact leads 109, 100 may be fed through a hollow insulating rod 105 that holds the spheres in place. If the reflective coating 103 of the outer sphere 101 has an optical transmission peak corresponding to the pump source wavelength, optical pumping can be accomplished by pumping directly through the outer sphere 101. Alternatively, optical pumping can be carried out using a transmission window formed in the outer reflective coating.

The concentric spheres 101, 102 may be held in place using a support apparatus 105. As shown in FIG. 1A, the support may be a hollow insulating rod. The hollow rod 105 may contain internal holes 107 for gas flow within the cavity, ducts for the leads 109, 110, and ducts 108 for liquid cooling purposes. Charging the cavity 104 with a gas or liquid active medium is accomplished through a port 112 in the rod 105. For atomic, ionic, and molecular gas media, the port 112 may be sealed off once the cavity 104 is filled. Alternatively, for chemically active media, the port 112 can be utilized as a gas source, with gas flowing out of upper holes 107 (e.g., located in the upper hemisphere of the cavity 104), into the interior 104, back into the rod 105 through bottom internal cavity holes (e.g., in the lower hemisphere of the cavity), and exiting out through an exhaust duct (not shown). Here, the rod 105 would either not extend into or entirely through the inner sphere 102, or the interior of the rod extending through the inner sphere would be sealed off.

A cooling unit or "chiller" 113 may be provided to remove excess interior heat generated during laser operation, for cooling the spherical resonator. Cooling is carried out by circulating a liquid or gaseous coolant from the chiller 113, through a coolant duct 108 in the rod 105 that passes through the inner sphere 102, down through an exit duct 111, and back into the chiller 113. Typically, the coolant duct 108 will have a smaller diameter than the support rod 105, which allows the support rod to act as a possible duct for gas circulation in conjunction with the exit ports 107 located inside the cavity 104. The interior of the inner sphere 102 may be provided with baffles (not shown) for distributing the coolant in the interior of the inner sphere, for facilitating increased rates of heat exchange.

Figure 2:
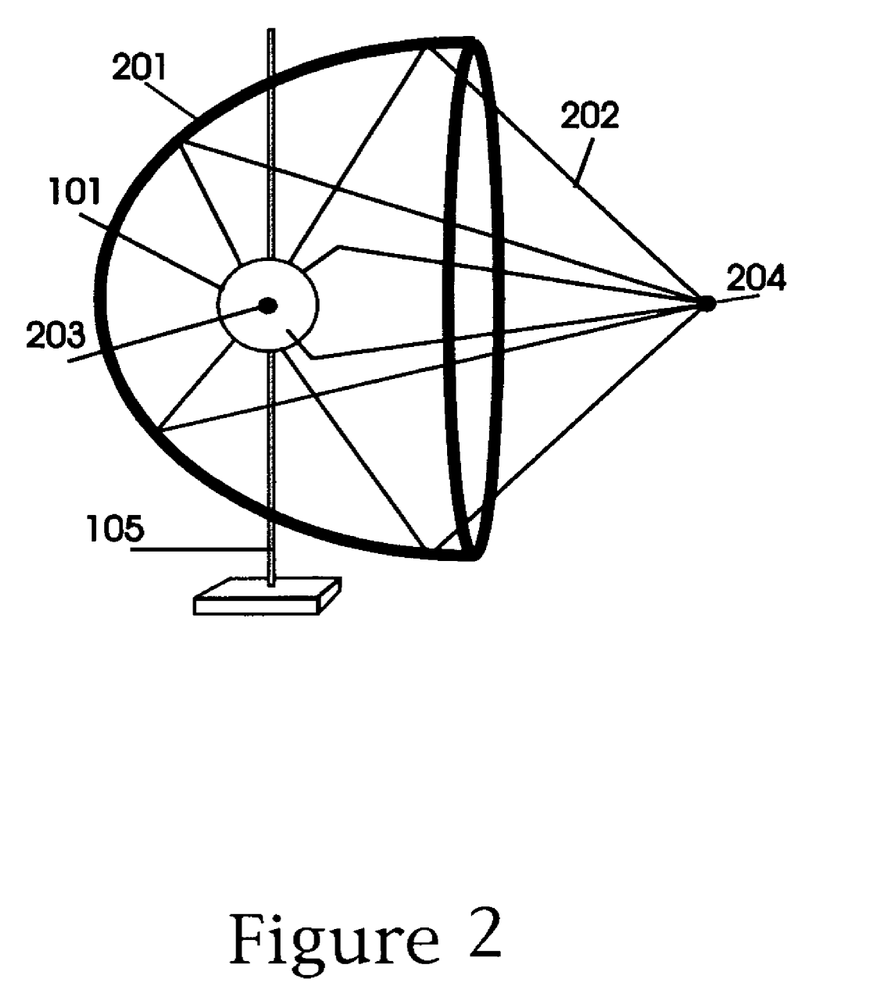
FIG. 2 is a schematic view of the spherical laser in use with an ellipsoidal collection mirror.
Figure 3:
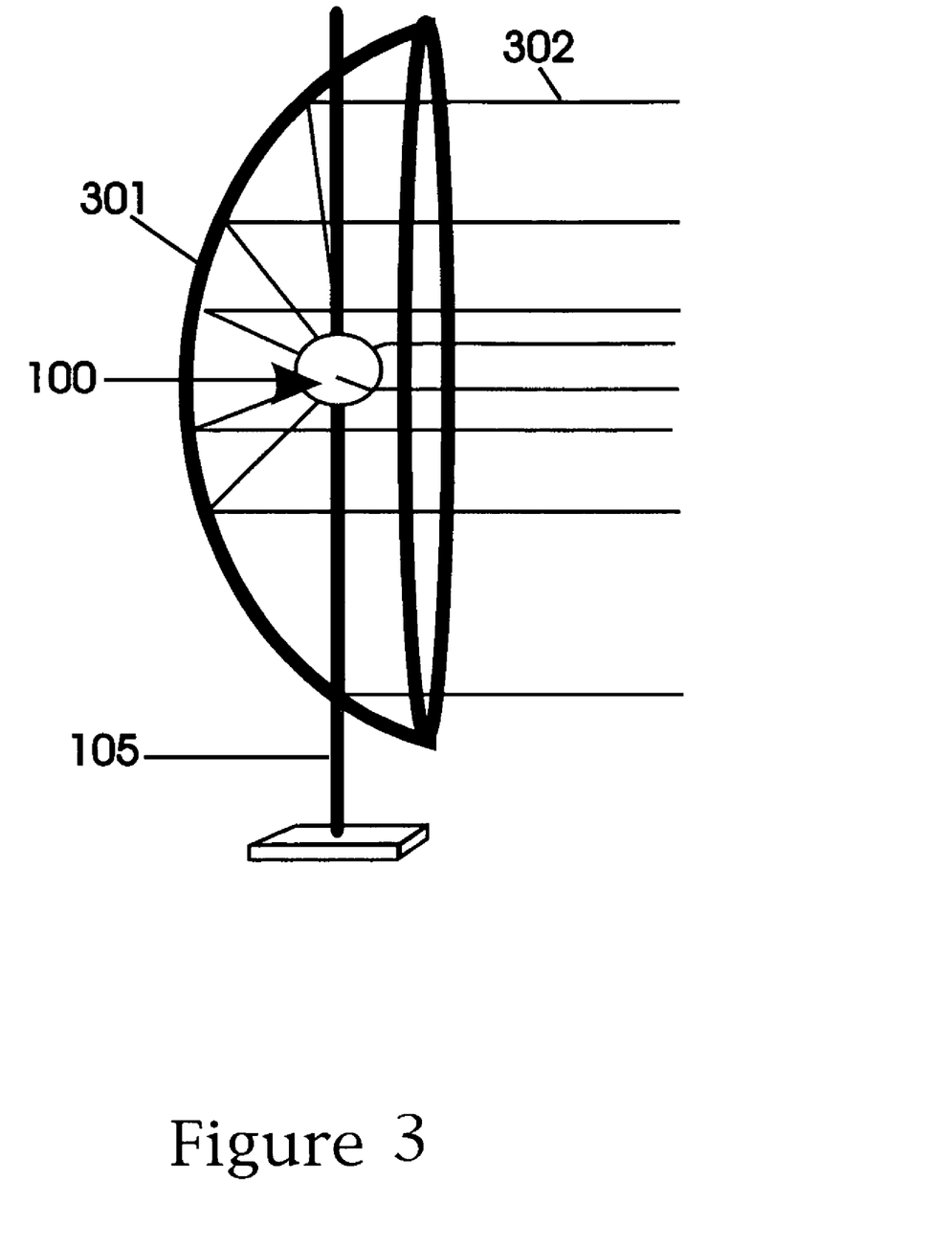
FIG. 3 is a schematic view of the spherical laser in use with a parabolic collection mirror.

In operation, the spherical laser 100 is caused to lase by exciting the gain medium 115 in the cavity 104 to meet lasing threshold conditions. The amplifying medium can be pumped optically by shining a light source into the cavity. Alternatively, an electric field can be applied between the two concentric spheres 101, 102 to excite the medium 115. The electric field can be established by applying a potential across the contact leads 109, 110, which are in turn connected to the interior cavity electrodes 106, 116. Photons generated in the cavity 104 are free to bounce back and forth between reflective surfaces 103, 114 of the inner and outer spheres. The reflective coating of the outer sphere 101 is semi-reflective, with a reflectivity of less than 100%. The outer sphere 101 thereby acts as an output coupler (OC), establishing laser light emission across the entire outer spherical surface, or at least the portion thereof not blocked by the support rod 105. Multi-wavelength operation can be achieved by utilizing a uniform gain medium having a broad emission spectrum, in conjunction with reflective coatings designed to amplify multiple wavelengths. The exiting radial laser emission can be harnessed by placing the spherical laser 100 inside a three dimensional mirror apparatus. The mirror apparatus may be a partial three-dimensional elliptical mirror 201, as shown in FIG. 2. (The ellipsoidal mirror in FIG. 2 is drawn transparently for illustrative purposes.) The spherical laser 100, supported by the rod 105 or otherwise, is positioned at a focal point of the ellipsoidal collection mirror 201, e.g., the left focal point 203. Radial emission 202 emanating from the spherical laser located at the left focal point 203 will be imaged at the right focal point 204. The ellipsoidal mirror 201 may be a partial ellipsoidal mirror, e.g., a section of an enclosed ellipsoidal mirror, or the imaged beam may be harnessed within an enclosed ellipsoidal mirror (see line 205 in FIG. 2). Typical ray traces 202 are shown for illustrating this effect. Alternatively, the spherical laser source 100 may be placed within a parabolic mirror 302, as shown in FIG. 3, for generating a columnated beam 303. The total output power is the integration of the exiting radiation across the spherical surface of the OC 101. Scalability can be achieved by increasing both R1 and R2 while maintaining a constant separation L, where L=R1−R2, as noted above. This maintains the same optical power surface density while increasing the surface area of the OC 101, thereby increasing the total output power.

The spherical laser 100 may be produced in the following manner. First, starting with high-sphericity inner and outer hollow spheres 101, 102, the outer sphere 101 is cut in half. The convex "outer" surface of the inner sphere 102 is coated with appropriate reflective coatings 114. The two hemispheres of the outer sphere 101 are precision ground and polished to prepare the concave "inner" surface for coating. The concave surfaces of the two outer hemispheres are then coated with appropriate reflective coatings 103. Holes are drilled in the inner sphere and two outer hemispheres to accommodate the support rod 105, which is used to house electrical contacts, liquid coolant ducts, and gas ducts, if required. If the inner sphere 102 is metal coated, the contact lead 110 is connected to the convex surface and fed through the support rod 105 exiting the device. (Here, the metal coating acts as a cathode-like electrical contact.) An anode-like electrical contact may be provided for the outer sphere 101 by coating the outer hemispheres with a transparent conductor, or by forming a metal wire mesh 106 to conform to the convex surfaces of the outer sphere. In such a case, the contact lead 109 is connected to the mesh or coating, and is fed through the support rod 105. The support rod 105 is placed through the inner sphere 102, the two hemispheres are positioned on the support rod to enclose the inner sphere, and any seams are sealed using a vacuum epoxy. The vessel cavity 104 is put under vacuum, and backfilled with gas or liquid amplifying media. Otherwise, the cavity is filled with the amplifying material prior to assembly of the inner sphere inside the two hemispheres. Appropriate excitation of the amplifying media will allow lasing to commence.

The spherical laser 100 utilizes a spherical resonator having two concentric, mirrored spheres 101, 102. The outer sphere 101 has a larger radius than the inner sphere 102. An amplifying medium 115 is disposed in the cavity 104 between the two spheres. The modes enclosed in such a spherical optical cavity are radial in nature. The spherical laser 100 is thereby capable of emulating a point source, with output powers scalable in conjunction with device geometry. Lasing is achieved when threshold conditions are met, and radial emission is supported through the OC (outer mirrored sphere). The spherical laser's output is scalable for a given excitation level by increasing both the inner and outer radii of the spherical mirrors, while maintaining a constant separation between the two concentric spheres. Since the distance between the inner and outer spheres is held constant (while the cavity volume is increased), the saturation conditions of the amplifying medium are not affected, thereby maintaining a constant power density at the output coupler for a given excitation level. The total output power is therefore determined by the power density multiplied by the surface area of the OC, resulting in an increase in output power for larger geometries. This effect is not possible in conventional one-dimensional laser resonators, because increasing device geometries changes the modal profile and saturation conditions of the amplifying medium, thereby altering the operating conditions.

In principle, the amplifying media housed within the spherical cavity 104 can be solid, liquid, or gas. Most active gas mediums can be used in the spherical laser. If a gas medium is used, the choice of gas medium will affect the choice of excitation means and cavity design, e.g., baffle or no-baffle. Depending upon the nature of the amplifying medium (e.g., whether atomic, ionic, or molecular), most gas lasers are excited by means of an electric discharge. As the electrons collide with the constituents of the active medium they induce transitions to higher energy levels. With sufficient pumping, population inversion is achievable. In many cases the population inversion of the amplifying medium is enhanced when the excited constituent is allowed to collide with the chamber walls, inducing non-radiative recombination and preventing a buildup in the lower excited states. Most active gas media that rely upon atomic and ionic transitions require sufficient sidewall collision rates to sustain population inversion. Atomic active media such as HeNe, noble gas active media such as Ne, and metal vapor active media including HeCd and HeSe fall in this class. For example, to insure sufficient sidewall collisions the bore radius of prior art HeNe lasers is limited to approximately 3 mm, which limits the output powers of prior art HeNe lasers to approximately 200 mW for useful length tubes.

Gas media that rely upon molecular excitation, including $CO_2$ (which relies upon molecular vibration transitions) and chemical active media (which rely upon chemical reactions, and may also be used in solid or liquid form), do not rely upon sidewall collisions to maintain population inversion. Therefore, they are good candidates for utilization in the spherical laser 100.

The emission of the spherical laser is harnessed by appropriately positioning the spherical laser 100 with respect to (i) a parabolic mirror 302 for columnated output, or (ii) an ellipsoidal mirror 201 for an imaged spot. In the case of an ellipsoidal mirror, the radial emission is imaged to a small spot whose spot size is not limited by diffraction. Thus, a major advantage of the present invention is the production of a non-diffraction limited laser spot. This is not possible for a beam focused with an optical lens. In particular, conventional lasers are focused to a small spot using optical lenses, with the focused spot size being ultimately limited to a spot on the order of one half the wavelength of emitted light as specified by the diffraction limit. Utilizing the spherical laser 100 and elliptical collection apparatus 201, infinitesimally small spot sizes are possible; the spot size is limited only by the accuracy of manufacturing, not by diffraction. Applications that would benefit from a reduced spot-size laser source include high-resolution microscopy, information storage, printing, photolithography, laser welding, drilling holes, cutting, and marking. The spherical laser 100 can also be harnessed to produce a columnated beam by enclosing it within a three dimensional mirrored parabola 302. Large spherical lasers (with radii on the order of feet) are capable of very high output powers (e.g., thousands of watts), which could be useful for military applications.

The spherical laser may utilize a gaseous amplifying medium that relies upon sidewall collisions. Typically, this requires the addition of an apparatus to enhance non-radiative recombination, for purposes of sustaining population inversion. This is due to the inherently large volume-to-surface-area ratio associated with spherical containers. To enhance non-radiative recombination within the spherical laser, a gas manifold is inserted within the spherical cavity. This increases sidewall collision centers, thereby increasing the gain of the amplifying medium. The manifold may take the form of a perforated material with radially extending holes, or it may comprise a number of spherical shells each separated by a small radial distance housing the amplifying media.

Figure 4A:
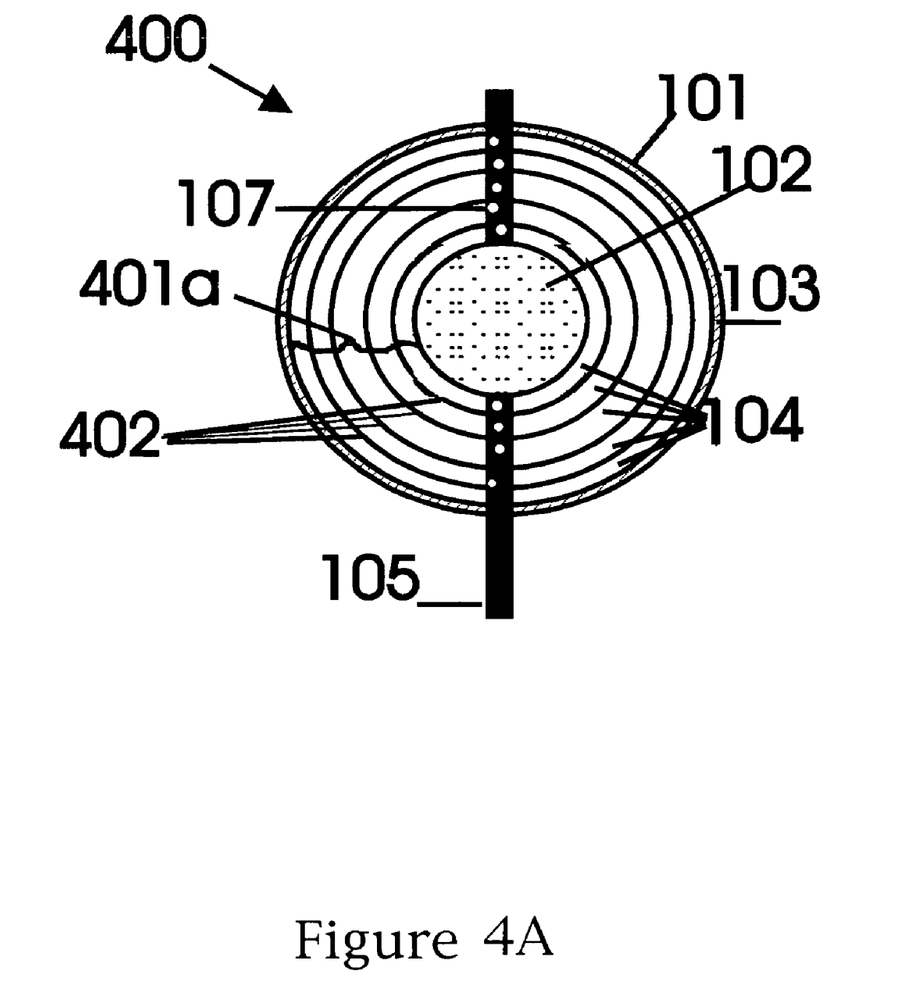
FIG. 4A is a schematic view, partially in cross section, of an embodiment of a spherical laser with a spherical shell interior gas manifold.
Figure 4B:
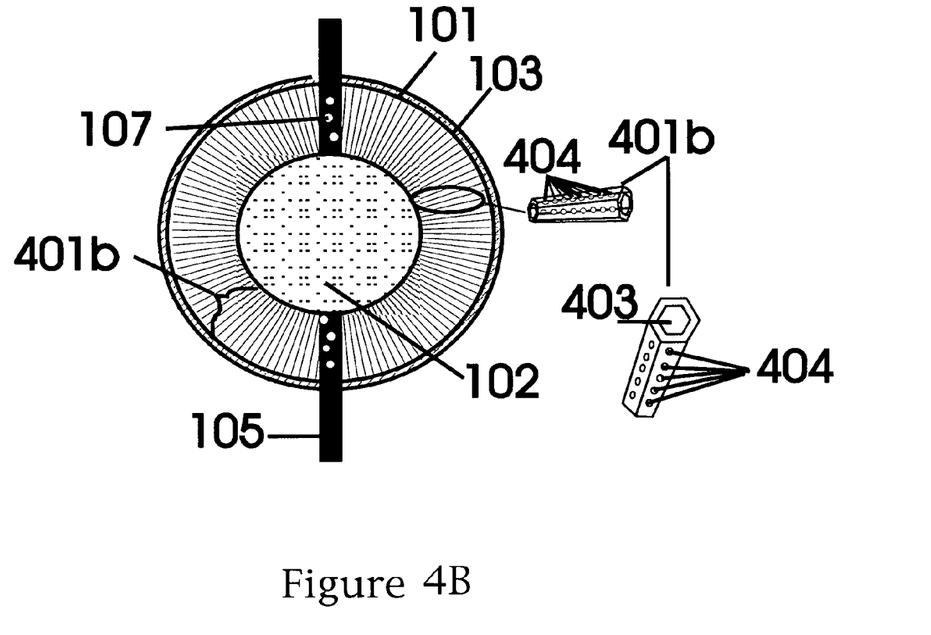
FIG. 4B is a schematic view, partially in cross section, of an embodiment of a spherical laser with a honeycombed interior gas manifold.

Embodiments of a "manifold-based" spherical laser 400 are shown in FIGS. 4A and 4B. The spherical laser 400 is generally similar to the spherical laser 100 described above, but additionally includes a gas manifold 401*a* or 401*b*. (Only the primary and/or additional elements of this embodiment are illustrated in the drawings; as implemented in practice, additional components as shown in FIGS. 1A-3 would typically be provided.) The gas manifold 401*a* or 401*b* enhances sidewall collisions, thereby allowing use of an amplifying medium that relies upon sidewall collisions to support population inversion, e.g., HeNe gas. The gas manifold may be a spherical shell manifold 401*a*, as shown in FIG. 4A. The spherical shell manifold 401*a* comprises a number of concentric shells or spheres 402 each separated by a small distance. The volume between concentric spheres is filled with amplifying media, with the proximity of the concentric shells providing ample sidewall collision sites for the active species. The shells may be made of glass, quartz, or the like. The gas manifold may also be a perforated or honeycombed manifold 401*b*, as shown in FIG. 4B. The perforated manifold 401*b* comprises a material perforated with radial holes 403 (in this case hexagonal shaped) forming tapered radial channels extending from the inner sphere 102 to the outer sphere 101. The regions between adjacent channels are also perforated with holes 404, as shown. Typically, the manifold 401*b* would enclose the inner sphere 102, filling the cavity 104. The advantage of the perforated manifold 401*b* is that it increases the surface area in which sidewall collisions may take place within the cavity 104. The material for the perforated manifold 401*b* may be NanoForm™ 15120 available from DSM Somos® (a high-temperature nanocomposite resin), another ceramic, ceramic-like, or composite material, or CNC-machined glass or quartz.

Operation of the manifold-based spherical laser 400 is generally the same as the operation of the spherical laser 100 shown in FIG. 1A, with the added ability of utilizing amplifying media that depend upon sidewall collisions to sustain population inversion. The shell manifold 401*a* is designed to maintain spherical symmetry while increasing sidewall collision sites. The spherical symmetry ensures that spherical cavity modes will be supported by the entire cavity. The overall gain of the device can be increased by adding more shells 402, assuming each shell is separated by a uniform distance. Utilizing a sufficient number of spherical shells, threshold conditions can be met and lasing supported. The perforated/honeycombed manifold 401*b* increases the vessel surface area, substantially increasing the gain for a given amplifying medium (e.g., one that relies upon sidewall collisions for population inversion).

Figure 5:
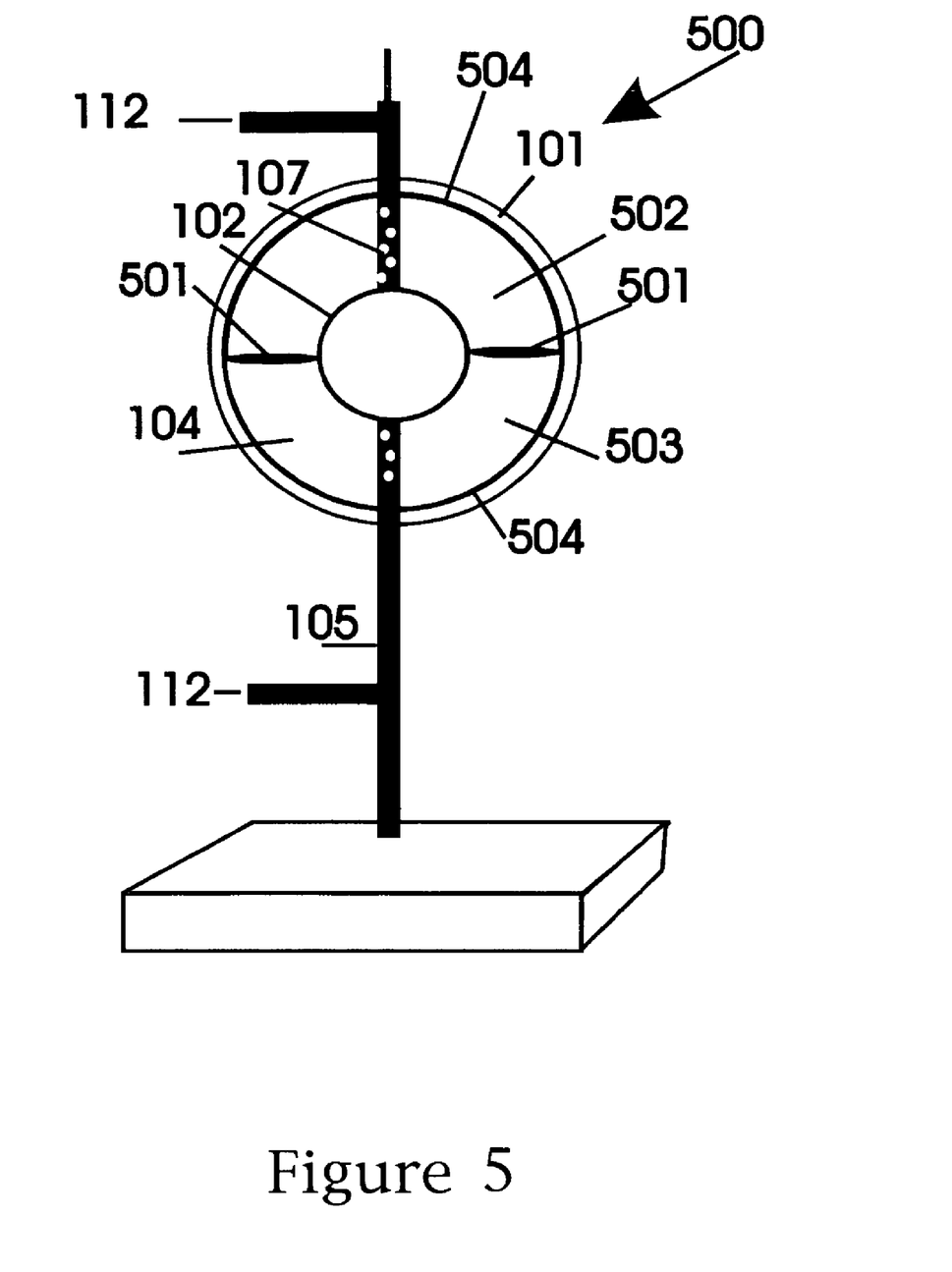
FIG. 5 is a schematic view, partially in cross section, of a multi-wavelength spherical laser, according to an additional embodiment of the present invention.

FIG. 5 shows a spherical laser 500 configured for multi-wavelength operation. (Like the manifold-based laser, only the primary and/or additional elements of this embodiment are illustrated in the drawings; as implemented in practice, additional components as shown in FIGS. 1A-3 would typically be provided.) Multi-wavelength operation is achieved by (i) housing different active mediums 502, 503 between the two spheres 101, 102, each confined to a different region/hemisphere of the spherical cavity by an isolation layer 501, or (ii) by utilizing multi-wavelength reflective coatings 504 and a single gain medium, or (iii) a combination of the two. For the former, the spherical cavity 104 is divided into different regions (2 or more) using the isolation layer 501, e.g., a ring-shaped, non-transmitting plate, thereby isolating or cordoning off the top and bottom hemispheres. One gain medium 502 is housed in one of the two isolated hemispherical cavities, and another gain medium 503 is housed in the other hemispherical cavity. The gain mediums 502, 503 support different lasing wavelengths. The semi-reflective coating 504 of the outer sphere 101 will also be different for the two hemispheres or regions. This approach can be expanded to include many different gasses, for accommodating a multitude of lasing wavelengths. Alternatively, multi-wavelength operation can also be achieved using a uniform gain medium having a broad emission spectrum, inside a non-segmented spherical cavity 104. The gain medium is used in conjunction with reflective coatings designed to amplify multiple wavelengths, or several spatially distributed, single wavelength coatings. The operation of the multi-wavelength spherical laser 500 follows the same methodology as the laser 100, but with multi-wavelength operation using wavelength-specific spherical sections and/or multi-wavelength reflective coatings.

Figure 6:
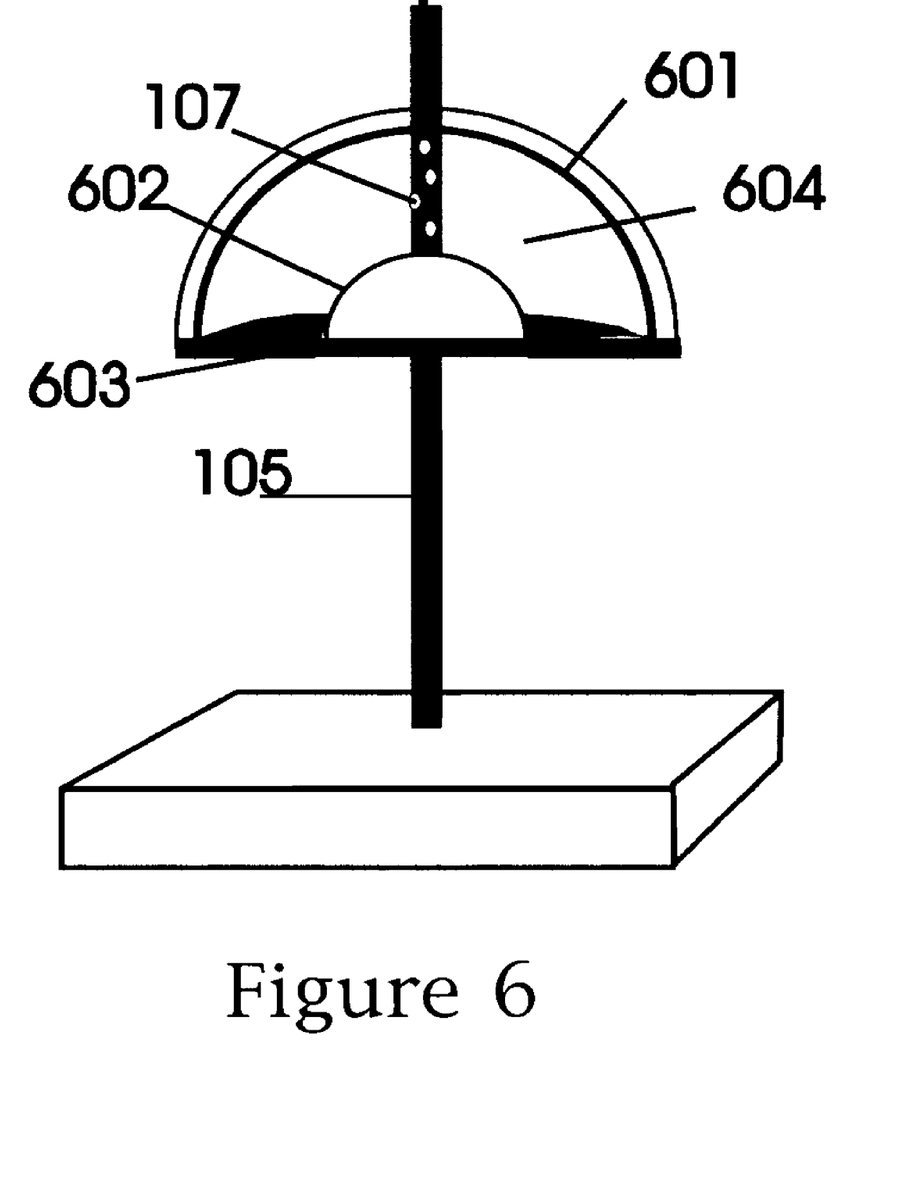
FIG. 6 is a schematic view, partially in cross section, of a hemispherical spherical laser, according to an additional embodiment of the present invention.

FIG. 6 shows a semi-spherical spherical laser 600, and more specifically a hemispherical laser. Here, instead of using complete spheres, the laser 600 uses inner and outer generally spherical vessels 601, 602, respectively, that are hemispherical in shape. In effect, the hemispherical spherical laser is one half of the spherical laser 100, designed to lase in only one hemisphere. (Again, only the primary and/or additional elements of this embodiment are illustrated in the drawings; as implemented in practice, additional components as shown in FIGS. 1A-3 would typically be provided.) The hemispherical laser 600 includes the inner 602 and outer 601 hemispherical vessels, each possessing both mirrored and conducting surfaces similar to the spherical laser 100 shown in FIG. 1A. This arrangement establishes a hemispherical cavity housing the gain medium 604. A base plane 603 separates the inner and outer hemispheres and provides electrical isolation, if required. The base 603 may be cooled to assist in heat dissipation. The operation of the hemispherical spherical laser follows the same principle and scalability as the spherical laser of FIG. 1A, with the exception of lasing only out of the upper hemisphere. As noted, instead of being specifically hemispherical in shape, the vessels 601, 602 may be semispherical in shape, e.g., a radial section of a sphere.

Figure 7:
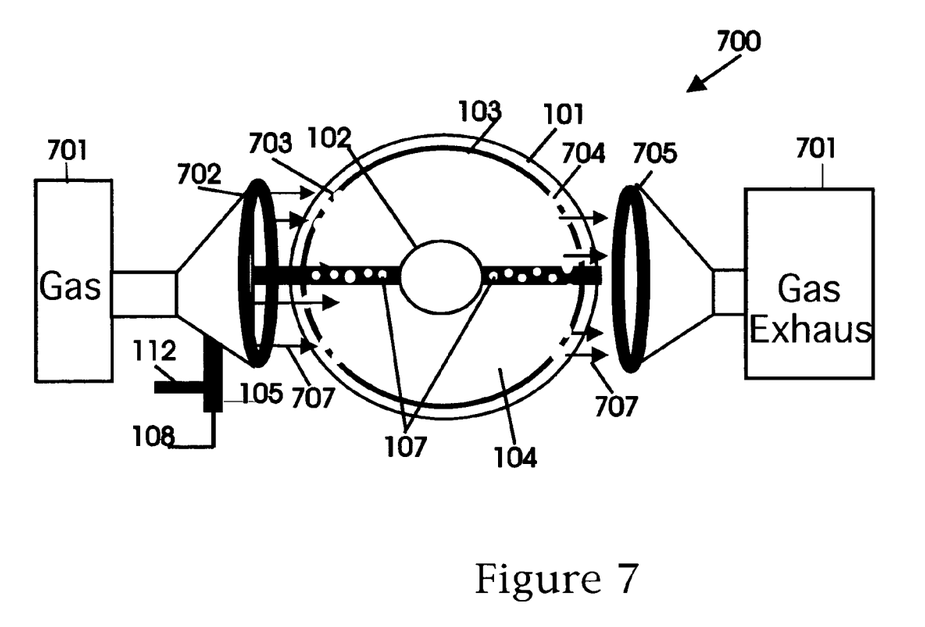
FIG. 7 is a schematic view, partially in cross section, of a spherical laser using a chemically active gain medium, according to an additional embodiment of the present invention.

An additional embodiment of the present invention relates to a spherical laser 700 utilizing a chemically active amplifying medium, as shown in FIG. 7. Again, many of the components would be same as shown and described above with respect to the laser 100 shown in FIG. 1A. For use with a continuous-flow, chemically active amplifying medium, a gas source 701 (storing a first gas 707) feeds a nozzle 702 configured to accelerate the first gas 707 and aim the gas 707 through entrance holes 703 into the spherical cavity 104. The cavity 104 is filled with a complementary gas utilizing the duct 112 and entrance holes 107. The two gases react chemically to generate an amplifying media. The gas flow is directed out exit holes 704 into a collection nozzle 705 and scrubber 706. If the chemical reaction requires optical stimulation, windows in the OC reflective coating 103 will allow entrance of pumping photons. Operation of the laser 700 is generally similar to the operation of the laser 100 in FIG. 1A, but without the need for electrical contacts and contact leads.

As noted, photons generated in the cavity 104 are free to bounce back and forth between the spheres 101, 102. The outer sphere 101 with its semi-reflective coating 103 (reflectivity less than 100%) acts as the exit mirror, whereby laser light exits through the entire outer spherical surface. The exiting laser radiation is collected using an outside mirror apparatus. As noted, the mirror apparatus may be an ellipsoidal mirror 201 or a parabolic mirror 302. However, the present invention is not limited to these two specific examples. Any reflecting surface can act as an integrator to some degree of success.

The choice of R1, R2, and L dictate whether the resonant cavity is stable or unstable, single or multiple longitudinal modes, and the optical power surface density existing at the outside of the outer sphere. The outer sphere radius R1, the inner sphere radius R2, and the cavity length L can be chosen to establish either a stable or unstable resonator, depending upon the L/R2 ratio. The total output power is the integration of the exiting surface optical power density across the outer spherical surface. Scalability is achieved by increasing both R1 and R2 while maintaining a constant R1/R2 ratio and cavity length. As noted, this maintains the same optical power surface density while increasing the total optical output power associated with a larger emitting surface area.

Figure 8A:
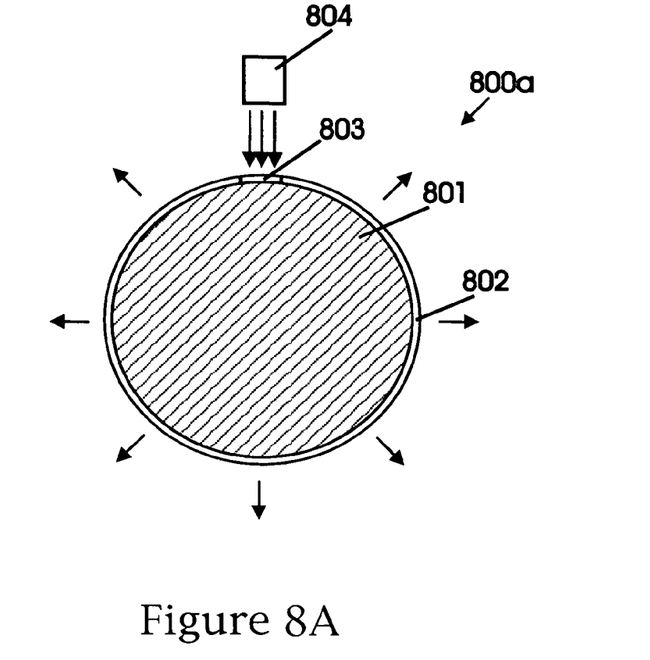
FIGS. 8A and 8B are schematic cross-sectional views of single-sphere lasers according to additional embodiments of the present invention.
Figure 8B:
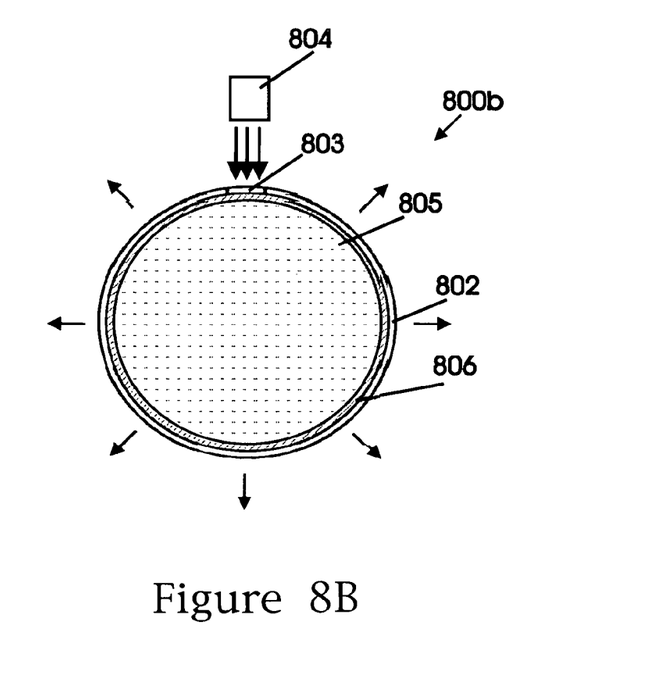

Although the spherical laser has been generally illustrated as having inner and outer spherical vessels, a single sphere could instead be used in conjunction with an optically active medium. (As should be appreciated, no inner sphere is needed because the optically active medium is not electrically excited, and therefore does not require an interior cathode-like contact for applying an electric field.) Examples are shown in FIGS. 8A and 8B. In FIG. 8A, a spherical laser 800a includes a solid spherical body 801 and a reflective coating 802. The sphere 801 is made of a doped glass that is optically excitable, e.g., the doped glass acts as an optically amplifying medium. A window 803 in the reflective coating can be utilized to admit optical stimulation for exciting the doped-glass amplifying medium. More particularly, the reflective coating 802 is semi-reflective at the lasing wavelengths, while the window 803 is transparent to the wavelength of optical stimulation. The window may be physical, e.g., a break in the coating, or it may be chemically/compositionally produced, e.g., a portion of the coating is made of a different or varying material or composition configured to admit the stimulation radiation wavelength(s). With ample optical stimulation, the laser 800a will lase, emitting a spherical mode or modes at a wavelength specified by the optically active doped glass. The doped glass, for example, may be neodymium-doped yttrium vanadate ($Nd^{3+}:YVO_4$) glass/crystal. Such glass would be pumped with 808 nm laser diodes 804, for emissions in the red, blue, green, or infrared wavelengths, all of which are excellent for microscopy of living cells. For manufacturing, doped glass would be formed into a sphere using a sphere machine. The sphere would then be coated with either a metal or dielectric semi-reflective coating, appropriately configured for inclusion of a window 803.

In FIG. 8B, a spherical laser 800b is generally similar to the spherical laser 800a. However, the optically active amplifying medium 805 is housed in a spherical vessel (e.g., made of quartz, glass, or other substrate material) 806 having an interior cavity. The coating 802 may be disposed either on the inside or outside of the spherical vessel 806. The laser 800b would be manufactured in a manner similar to as described above with regards to the laser 100 in FIG. 1A, e.g., a spherical vessel is bisected, filled with the amplifying medium, resealed, and so on. Alternatively, a small hole could be cut in the vessel, with the medium 805 being poured in, e.g., in liquid, molten solid, powder, or other at least temporarily flowable form. For a molten solid, differences in shrinkage between the melted solid and vessel 806 would typically be taken into account, and the materials would be allowed to slowly cool. It should be noted that the optically active medium does not have to fill the entirety of the cavity, or be uniform. For example, a piece or lump of material in the cavity would still feed the spherical modes of the cavity, upon optical stimulation.

As should be appreciated, according to the description above, the excitation means for exciting the medium will depend on the medium used, and may include a light source for optical pumping, applied electric potentials/voltages or other electrical signals, chemical reactions, or the like.

Since certain changes may be made in the above-described scalable spherical laser, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A spherical laser apparatus comprising:
    a first generally spherical body, said first body comprising a generally spherical vessel having an interior cavity and a semi-reflective surface for optical feedback, said first body including at least one amplifying medium being disposed in the interior cavity for generating photons upon excitation;
    a second generally spherical body having a reflective surface and a radius smaller than a radius of the first body, wherein the first and second bodies are generally concentrically positioned to form a generally spherical, concentric cavity therebetween, said at least one amplifying medium being disposed in the concentric cavity;

an excitation device cooperative with at least one of the first body and the second body for controllable excitation of said at least one amplifying medium, wherein the first body is configured to radially emit coherent light when the excitation device is controlled to excite the at least one amplifying medium to meet lasing threshold conditions, the excitation device being configured for application of an electric field through at least a portion of the concentric cavity, wherein the at least one amplifying medium includes at least one electrically excitable amplifying medium;

the excitation device including at least one voltage source, and further including first and second electrodes disposed in the concentric cavity and electrically connected to the at least one voltage source;

the first electrode including one of the reflective surface of the second body and a first electrical contact attached to the second body;

the second electrode including one of the semi-reflective surface of the first body and a second electrical contact attached to the first body;

the first and second electrical contacts each including one of a conductive mesh and at least one electrically conductive coating, the at least one electrically conductive coating being at least semi-transparent; and a mirror device positioned external to the first generally spherical body for collecting at least a portion of the coherent light emitted by the first generally spherical body, wherein the mirror device is one of (i) a parabolic mirror device for columnated collection of said at least a portion of the coherent light emitted by the first body and (ii) an ellipsoidal mirror device, said first body being positioned at a first focal point of the ellipsoidal mirror device for imaging said at least a portion of the coherent light emitted by the first body at a second focal point of the ellipsoidal mirror device.

2. A spherical laser apparatus comprising:

a first generally spherical body, said first body comprising a generally spherical vessel having an interior cavity and a semi-reflective surface for optical feedback, said first body including at least one amplifying medium being disposed in the interior cavity for generating photons upon excitation;

a second generally spherical body having a reflective surface and a radius smaller than a radius of the first body, wherein the first and second bodies are generally concentrically positioned to form a generally spherical, concentric cavity therebetween, said at least one amplifying medium being disposed in the concentric cavity; and an excitation device cooperative with at least one of the first body and the second body for controllable excitation of said at least one amplifying medium, wherein the first body is configured to radially emit coherent light when the excitation device is controlled to excite the at least one amplifying medium to meet lasing threshold conditions, the excitation device being configured for application of an electric field through at least a portion of the concentric cavity, wherein the at least one amplifying medium includes at least one electrically excitable amplifying medium;

the excitation device including at least one voltage source, and further including first and second electrodes disposed in the concentric cavity and electrically connected to the at least one voltage source;

the first electrode including one of the reflective surface of the second body and a first electrical contact attached to the second body;

the second electrode including one of the semi-reflective surface of the first body and a second electrical contact attached to the first body; and the first and second electrical contacts each including one of a conductive mesh and at least one electrically conductive coating, the at least one electrically conductive coating being at least semi-transparent.

3. The apparatus of claim 2 wherein the first and second generally spherical bodies are each generally semi-spherical in shape.

4. The apparatus of claim 2 further comprising:

a support apparatus attached to the first and second bodies for maintaining generally concentric positioning of the first and second bodies.

5. The apparatus of claim 2 wherein:

the at least one amplifying medium includes at least one gaseous amplifying medium dependent upon sidewall collisions for population inversion; and the apparatus further comprises a manifold disposed in said concentric cavity for increasing sidewall collisions to enhance population inversion of said at least one gaseous amplifying medium.

6. The apparatus of claim 5 wherein the manifold comprises a plurality of concentric, spaced-apart, generally spherical shells, said at least one gaseous amplifying medium occupying regions between said shells.

7. The apparatus of claim 5 wherein the manifold comprises an insulating material perforated with radial and angular holes, said at least one gaseous amplifying medium occupying said holes.

8. The apparatus of claim 2 wherein the first body includes at least one duct for passage of said at least one amplifying medium into said concentric cavity, said at least one amplifying medium being at least a temporarily flowable medium.

9. The apparatus of claim 2 wherein the first and second bodies include ducts for establishing a flow circuit for liquid cooling of said laser apparatus, said flow circuit initiating at a liquid reservoir, passing through said first body, passing through the concentric cavity, passing through said second body, again passing through the concentric cavity, exiting through the first body, and traveling back to said liquid reservoir.

10. A spherical laser apparatus comprising:

a first generally spherical body, said first body comprising a generally spherical vessel having an interior cavity and a semi-reflective surface for optical feedback, said first body including at least one amplifying medium being disposed in the interior cavity for generating photons upon excitation;

a second generally spherical body having a reflective surface and a radius smaller than a radius of the first body, wherein the first and second bodies are generally concentrically positioned to form a generally spherical, concentric cavity therebetween, said at least one amplifying medium being disposed in the concentric cavity;

an excitation device cooperative with at least one of the first body and the second body for controllable excitation of said at least one amplifying medium, wherein the first body is con figured to radially emit coherent light when the excitation device is controlled to excite the at least one amplifying medium to meet lasing threshold conditions, the excitation device being configured for application of an electric field through at least a portion of the concentric cavity, wherein the at least one amplifying medium includes at least one electrically excitable amplifying medium;

the excitation device including at least one voltage source, and further including first and second electrodes disposed in the concentric cavity and electrically connected to the at least one voltage source;

the first electrode including one of the reflective surface of the second body and a first electrical contact attached to the second body;

the second electrode including one of the semi-reflective surface of the first body and a second electrical contact attached to the first body;

the first and second electrical contacts each including one of a conductive mesh and at least one electrically conductive coating, the at least one electrically conductive coating being at least semi-transparent;

a support apparatus attached to the inner and outer bodies for maintaining the spaced apart positioning thereof; and a mirror device positioned external to the outer body for collecting at least a portion of the coherent light emitted by the outer body.

\* \* \* \* \*